(12) United States Patent
Zhou et al.

(10) Patent No.: US 11,937,184 B2
(45) Date of Patent: Mar. 19, 2024

(54) METHOD FOR DETERMINING SLEEP STATE, TERMINAL, AND READABLE MEDIUM

(71) Applicant: SPREADTRUM COMMUNICATIONS (SHANGHAI) CO., LTD., Shanghai (CN)

(72) Inventors: Huayu Zhou, Shanghai (CN); Xinghang Gao, Shanghai (CN); Zhikun Xu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 18/297,263

(22) Filed: Apr. 7, 2023

(65) Prior Publication Data
US 2023/0276363 A1    Aug. 31, 2023

Related U.S. Application Data

(63) Continuation of application No. 17/266,769, filed as application No. PCT/CN2019/096776 on Jul. 19, 2019, now Pat. No. 11,653,305.

(30) Foreign Application Priority Data

Aug. 10, 2018 (CN) .......................... 201810912849.4

(51) Int. Cl.
*H04W 52/02* (2009.01)
(52) U.S. Cl.
CPC ............................. *H04W 52/0235* (2013.01)

(58) Field of Classification Search
CPC ......................... H04W 52/0235; Y02D 30/70
(Continued)

(56) References Cited

U.S. PATENT DOCUMENTS

2008/0031173 A1   2/2008 Zhang et al.
2008/0267104 A1   10/2008 Zhang
(Continued)

FOREIGN PATENT DOCUMENTS

CN    1802015 A    7/2006
CN    1889764 A    1/2007
(Continued)

OTHER PUBLICATIONS

LG Electronics, "Discussion on wake up signal and wake up channel for NB-IoT"; 3GPP TSG RAN WGI Meeting #90, R1-1713100; Aug. 21-25, 2017; 13 pages.
(Continued)

*Primary Examiner* — Robert J Lopata
(74) *Attorney, Agent, or Firm* — CANTOR COLBURN LLP

(57) ABSTRACT

A method for determining a sleep state, a terminal, and a readable medium. The method for determining a sleep state comprises receiving sleep instruction information sent by a base station; and on the basis of the sleep instruction information, entering a sleep state and selecting different modes. By application of the solution, a UE can be flexibly instructed to enter a sleep state without affecting the quality of service, thereby reducing the power consumption of the UE, and achieving the purpose of power saving.

20 Claims, 2 Drawing Sheets

```
┌─────────────────────────────────────────────────┐
│ sleep indication information is received from a │ ── S101
│                    base station                 │
└─────────────────────────────────────────────────┘
                          │
                          ▼
┌─────────────────────────────────────────────────┐
│ the sleep state is entered and a different mode │ ── S102
│  is selected based on the sleep indication info │
└─────────────────────────────────────────────────┘
```

(58) Field of Classification Search
USPC .......................................................... 370/329
See application file for complete search history.

(56) References Cited

U.S. PATENT DOCUMENTS

| | | | |
|---|---|---|---|
| 2018/0332533 A1* | 11/2018 | Bhattad | H04W 52/0235 |
| 2018/0332655 A1* | 11/2018 | Ang | H04W 52/0216 |
| 2019/0297577 A1* | 9/2019 | Lin | H04W 52/0219 |
| 2020/0037396 A1* | 1/2020 | Islam | H04W 52/0229 |
| 2020/0178172 A1* | 6/2020 | Thangarasa | H04W 76/28 |
| 2020/0187237 A1* | 6/2020 | Su | H04L 1/08 |
| 2020/0413341 A1 | 12/2020 | Xu et al. | |
| 2021/0168715 A1* | 6/2021 | Huang | H04W 24/08 |
| 2021/0168781 A1* | 6/2021 | Lee | H04W 72/23 |
| 2021/0195517 A1* | 6/2021 | Yang | H04W 52/0229 |
| 2021/0204244 A1* | 7/2021 | Rune | H04W 72/0446 |
| 2021/0314084 A1* | 10/2021 | Hwang | H04L 1/1854 |
| 2021/0314910 A1* | 10/2021 | Rune | H04L 5/0094 |

FOREIGN PATENT DOCUMENTS

| | | |
|---|---|---|
| CN | 1893725 A | 1/2007 |
| CN | 101557560 A | 10/2009 |
| CN | 108235412 A | 6/2018 |
| CN | 108307406 A | 7/2018 |
| IN | 107690164 A | 2/2018 |
| WO | 2007000099 A1 | 1/2007 |
| WO | 2010118659 A1 | 10/2010 |

OTHER PUBLICATIONS

Qualcomm Incorporated, "Efficient monitoring of DL controls channels"; 3GPP TSG RAN WGI Meeting #90bis, R1-1718135; Oct. 9-13, 2017; 11 pages.

CNIPA First Office Action for corresponding CN Application No. 201810912849.4; dated Apr. 30, 2021.

EPO Extended European Search Report for corresponding EP Application No. 19846584.1; dated Mar. 25, 2022.

Ericsson, "eMTC power consumption reduction for paging and connected and connected-mode Drx"; 3GPP TSG-RAN WG2 #99, R2-1708285; Aug. 21-25, 2017; 8 pages.

International Search Report for International Application PCT/CN2019/096776; dated Oct. 17, 2019.

IPIN Office Action for corresponding IN Application No. 202117009437; dated Jan. 27, 2022.

LG Electronics, "UE power consumption reduction by new physical signal/channel in MTC"; 3GPP TSG RAN WG1 Meeting #89, R1-1707568; May 15-19, 2017; 6 pages.

Qualcomm Incorporated, "Wake-Up Signaling for C-DRX", 3rd Generation Partnership Project, 3GPP TSG RAN WG2 NR #99 (Dated: Aug. 21-25, 2017), R2-1709115, 5 pages.

USPTO Final Office Action corresponding to U.S. Appl. No. 17/266,769; dated Jun. 30, 2022.

USPTO Notice of Allowance corresponding to U.S. Appl. No. 17/266,769; dated Jan. 10, 2023.

* cited by examiner

METHOD FOR DETERMINING SLEEP STATE, TERMINAL, AND READABLE MEDIUM

CROSS-REFERENCE TO RELATED APPLICATIONS

The present application is a continuation application of U.S. patent application Ser. No. 17/266,769, filed on Feb. 8, 2021, the entire contents of which are incorporated herein by reference and priority to which is hereby claimed. Application Ser. No. 17/266,769 is the U.S. National stage of application No. PCT/CN2019/096776, filed Jul. 19, 2019. Priority under 35 U.S.C. § 119(a) and 35 U.S.C. § 365(b) is hereby claimed from Chinese Application No. 201810912849.4, filed Aug. 10, 2018, the disclosure of which is also incorporated herein by reference.

TECHNICAL FIELD

The present disclosure generally relates to communication technology field, and more particularly, to a method for determining a sleep state, a terminal and a readable medium.

BACKGROUND

In a 5G system, to reduce power consumption of a User Equipment (UE), a Discontinuous Reception (DRX) mechanism is introduced.

In a connected state, the UE, according to DRX configuration parameters indicated by a terminal, generally only performs Physical Downlink Control Channel (PDCCH) monitoring during a DRX on duration, which enables the UE to sleep periodically, so as to save power.

In the 5G system, although the UE can turn off a receiver through the DRX mechanism and enter a sleep state, the UE has a relatively short sleep time and still consume much power due to fixed configuration of DRX parameters.

SUMMARY

Embodiments of the present disclosure may further reduce power consumption of a UE, so as to save power.

In an embodiment of the present disclosure, a method for determining a sleep state is provided, including receiving sleep indication information from a base station; and entering the sleep state and selecting a different mode based on the sleep indication information.

Optionally, the method further includes not entering the sleep state based on the sleep indication information.

Optionally, the sleep state includes any one of following behaviors: not monitoring PDCCH within on duration, not monitoring one or more PDCCH search spaces or PDCCH search space sets that need to be monitored in a non-sleep state, or changing from monitoring one or more PDCCH search spaces or PDCCH search space sets that need to be monitored in a non-sleep state to monitoring another one or more PDCCH search spaces or PDCCH search space sets.

Optionally, the mode includes first mode and a second mode, wherein the first mode indicates entering the sleep state, and that a current PDCCH has scheduling information, and the second mode indicates entering the sleep state, and that the current PDCCH has no scheduling information.

Optionally, for the second mode, scheduling information bit in Downlink Control Information (DCI) is used to indicate at least one of following: a time offset between a moment of entering the sleep state and a moment of waking up, configuration parameters of a PDCCH search space set associated with the sleep state, an index of a PDCCH search space set associated with the sleep state, or an identity of a PDCCH search space set associated with the sleep state.

Optionally, the mode includes a first mode and a second mode, wherein the first mode indicates entering the sleep state without waking up within on duration, and the second mode indicates entering the sleep state which needs to be awakened within On duration.

Optionally, for the second mode, scheduling information bit in downlink control information is used to indicate at least one of following: a time offset between a moment of entering the sleep state and a moment of waking up, configuration parameters of the PDCCH search space set associated with the sleep state, an index of the PDCCH search space set associated with the sleep state, or an identity of the PDCCH search space set associated with the sleep state.

Optionally, receiving sleep indication information from a base station includes receiving downlink control information from the base station, wherein two bits in the downlink control information are used to indicate the sleep indication information, and the sleep indication information is transmitted in a PDCCH in a UE-specific search space.

Optionally, receiving sleep indication information from a base station includes receiving downlink control information from the base station, wherein one bit and a DCI format in the downlink control information are used to indicate the sleep indication information, and the sleep indication information is transmitted in a PDCCH in a UE-specific search space.

Optionally, entering the sleep state and selecting a different mode based on the sleep indication information includes: when one bit in the downlink control information indicates to enter the sleep state and the DCI format is a downlink DCI format, entering the sleep state and selecting the first mode; or when one bit in the downlink control information indicates to enter the sleep state, and the DCI format is an uplink DCI format, entering the sleep state and selecting the second mode.

Optionally, receiving sleep indication information from a base station includes receiving downlink control information from the base station, wherein one bit and a frequency domain resource allocation field in the downlink control information are used to indicate the sleep indication information, and the sleep indication information is transmitted in a PDCCH in a UE-specific search space.

Optionally, entering the sleep state and selecting a different mode based on the sleep indication information includes: when one bit in the downlink control information indicates to enter the sleep state, and the frequency domain resource allocation field is valid frequency domain resource allocation indication, entering the sleep state and selecting the first mode; or when one bit in the downlink control information indicates to enter the sleep state, and the frequency domain resource allocation field is invalid frequency domain resource allocation indication, entering the sleep state and selecting the second mode.

Optionally, receiving sleep indication information from a base station includes receiving downlink control information from the base station, wherein at least one bit in the downlink control information is used to indicate the sleep indication information corresponding to a current UE, a subgroup where the current UE is located, or a group where the current UE is located, and the sleep indication information is transmitted in a PDCCH in a common search space.

Optionally, the mode includes a first mode and a second mode, wherein the first mode indicates entering the sleep state, and that a PDCCH in a search space set corresponding to a monitoring occasion that is separated by a preset monitoring duration from a current monitoring occasion has scheduling information, and the second mode indicates entering the sleep state, and that the PDCCH in the search space set corresponding to the occasion that is separated by the preset monitoring duration from the current monitoring occasion has no scheduling information.

Optionally, the mode includes a first mode and a second mode, wherein the first mode indicates entering the sleep state without waking up within on duration, and the second mode indicates entering the sleety state which needs to be awakened within On duration.

Optionally, for the first mode, scheduling information bit in the downlink control information is used to indicate at least one of following: a time offset between a moment of entering the sleep state and a moment of waking up, configuration parameters of a PDCCH search space set associated with the sleep state, an index of a PDCCH search space set associated with the sleep state, or an identity of a PDCCH search space set associated with the sleep state.

Optionally, for the second mode, scheduling information bit in the downlink control information is used to indicate at least time of following: a time offset between a moment of entering the sleep state and a moment of waking up, configuration parameters of a PDCCH search space set associated with the sleep state, an index of a PDCCH search space set associated with the sleep state, or an identity of a PDCCH search space set associated with the sleep state.

In an embodiment of the present disclosure, a terminal is provided, including: a receiving circuitry configured to receive sleep indication information from a base station; and a first processing circuitry configured to enter a sleep state and select a different mode based on the sleep indication information.

Optionally, the terminal further includes: a second processing circuitry configured to not enter the sleep state based on the sleep indication information.

Optionally, the sleep state includes any one of following behaviors: not monitoring PDCCH within On duration, not monitoring one or more PDCCH search spaces or PDCCH search space sets that need to be monitored in a non-sleep state, or changing from monitoring one or more PDCCH search spaces or PDCCH search space sets that need to be monitored in a non-sleep state to monitoring another one or more PDCCH search spaces or PDCCH search space sets.

Optionally, the mode includes a first mode and a second mode, wherein the first mode indicates entering the sleep state, and that a current PDCCH has scheduling information, and the second mode indicates entering the sleep state, and that the current PDCCH has no scheduling information.

Optionally, for the second mode, scheduling information bit in DCI is used to indicate at least one of following: a time offset between a moment of entering the sleep state and a moment of waking up, configuration parameters of a PDCCH search space set associated with the sleep state, an index of a PDCCH search space set associated with the sleep state, or an identity of a PDCCH search space set associated with the sleep state.

Optionally, the mode includes a first mode and a second mode, wherein the first mode indicates entering the sleep state without waking up within On duration, and the second mode indicates entering the sleep state which needs to be awakened within On duration.

Optionally, for the second mode, scheduling information bit in downlink control information is used to indicate at least one of follow: a time offset between a moment of entering the sleep state and a moment of waking up, configuration parameters of the PDCCH search space set associated with the sleep state, an index of the PDCCH search space set associated with the sleep state, or an identity of the PDCCH search space associated with the sleep state.

Optionally, the receiving circuitry is configured to receive downlink control information from the base station, wherein two bits in the downlink control information are used to indicate the sleep indication information, and the sleep indication information is transmitted in a PDCCH in a UE-specific search space.

Optionally, the receiving circuitry is configured to receive downlink control information from the base station, wherein one bit and a DCI format in the downlink control information are used to indicate the sleep indication information, and the sleep indication information is transmitted in a PDCCH in a UE-specific search space.

Optional the first processing circuitry is configured to: when one bit in the downlink control information indicates to enter the sleep state and the DCI format is a downlink DCI format, enter the sleep state and select the first mode; or when one bit in the downlink control information indicates to enter the sleep state, and the DCI format is an uplink DCI format, enter the sleep state and select the second mode.

Optionally, the first processing circuitry is configured to receive downlink control information from the base station, wherein one bit and a frequency domain resource allocation field in the downlink control information are used to indicate the sleep indication information, and the sleep indication information is transmitted in a PDCCH in a UE-specific search space.

Optionally, the first processing circuitry is configured to: when one bit in the downlink control information indicates to enter the sleep state, and the frequency domain resource allocation field is valid frequency domain resource allocation indication, enter the sleep state and select the first mode; or when one bit in the downlink control information indicates to enter the sleep state, and the frequency domain resource allocation field is invalid frequency domain resource allocation indication, enter the sleep state and select the second mode.

Optionally, the first processing circuitry is configured to receive downlink control information from the base station, wherein at least one bit in the downlink control information is used to indicate the sleep indication information corresponding to the terminal, a subgroup where the terminal is located, or a group where the terminal is located, and the sleep indication information is transmitted in a PDCCH in a common search space.

Optionally, the mode includes a first mode and a second mode, wherein the first mode indicates entering the sleep state, and that a PDCCH in a search space set corresponding to a monitoring occasion that is separated by a preset monitoring duration from a current monitoring occasion has scheduling information, and the second mode indicates entering the sleep state, and that the PDCCH in the search space set corresponding to the monitoring occasion that is separated by the preset monitoring duration from the current monitoring occasion has no scheduling information.

Optionally, the mode includes a first mode and a second mode, wherein the first mode indicates entering the sleep state without waking up within On duration, and the second mode indicates entering the sleep state which needs to awakened within On duration.

Optionally, for the first mode, scheduling information bit in the downlink control information is used to indicate at least one of following: a time offset between a moment of entering the sleep state and a moment of waking up, configuration parameters of a PDCCH search space set associated with the sleep state, an index of a PDCCH search space set associated with the sleep state, or an identity of a PDCCH search space set associated with the sleep state.

Optionally, for the second mode, scheduling information bit in the downlink control information is used to indicate at least one of following: a time offset between a moment of entering the sleep state and a moment of waking up, configuration parameters of a PDCCH search space set associated with the sleep state, an index of a PDCCH search space set associated with the sleep state, or an identity of a PDCCH search space set associated with the sleep state.

In an embodiment of the present disclosure, a nonvolatile or nontransitory computer readable storage medium having computer instructions stored therein is provided, wherein when the computer instructions are executed, any one above methods is performed.

In an embodiment of the present disclosure, a terminal including a memory and a processor is provided, wherein the memory has computer instructions stored therein, and when the processor executes the computer instructions, any one of the above methods is performed.

Embodiments of the present disclosure may provide following advantages.

In embodiments of the present disclosure, sleep indication information is received from a base station, and a sleep state is entered, and a different mode is selected based on the sleep indication information. A UE may be flexibly indicated to enter the sleep state without affecting quality of service, thereby reducing power consumption of the UE and saving power.

DETAILED DESCRIPTION

In a 5G system, although a UE can turn off a receiver through a DRX mechanism and enter a sleep state, the UE has a relatively short sleep time and still consume much power due to fixed configuration of DRX parameters.

In embodiments of the present disclosure, sleep indication information is received from a base station, and a sleep state is entered, and a different mode is selected based on the sleep indication information. A UE may be flexibly indicated to enter the sleep state without affecting quality of service, thereby reducing power consumption of the UE, and saving power.

In order to clarify the objects, characteristics and advantages of the disclosure, embodiments of present disclosure will be described in detail in conjunction with accompanying drawings.

Figure 1:
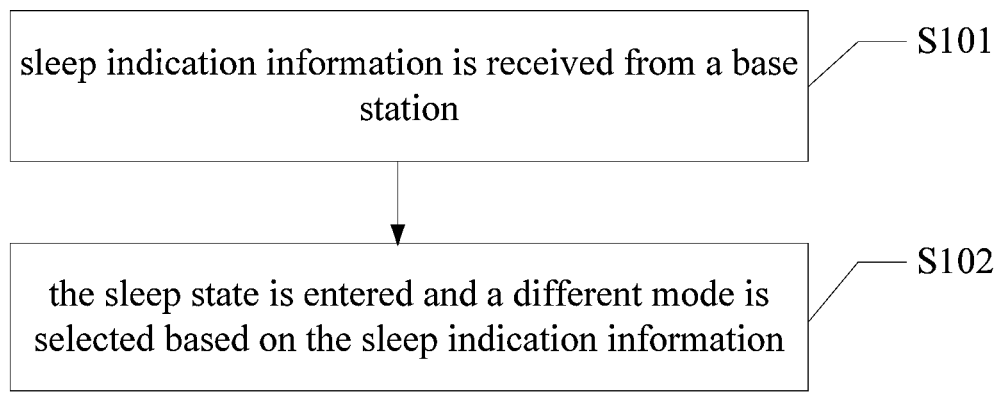
FIG. 1 is a flow chart of a method for determining a sleep state according to an embodiment.

FIG. 1 is a flow chart of a method for determining a sleep state according to an embodiment. Referring to FIG. 1, the method may include S101 and S102.

In S101, sleep indication information is received from a base station.

In the existing techniques, a UE enters a sleep state through the DRX mechanism, resulting a relatively short sleep time and great power consumption of the UE. In embodiments of the present disclosure, the sleep indication information sent by the base station is used to dynamically indicate the UE to Go-To-Sleep (GTS), that is, dynamically indicate the UE to enter the sleep state within On duration.

In some embodiments, the sleep indication information may be indicated through DCI.

The sleep indication information may be transmitted in a UE-specific Search Space (USS, also referred to as a UE-specific search space set), that is, in a PDCCH in the USS, or in a Common Search Space (CSS, also referred to as a common search space set), that is, in a PDCCH in the CSS.

In some embodiments, the base station may configure a Control Resource Set (CORESET) and a search space set. The CORESET includes a frequency domain resource location and the number of time domain symbols of a PDCCH monitored by the UE, mapping between a Control Channel Element (CCE) and a Resource Element Group (REG) (i.e., CCE-to-REG mapping), and other information. The search space set includes a slot period of the PDCCH monitored by the UE, a start symbol position in a slot, an aggregation level and other information. Each search space set is bound to a CORESET. The search space set and its bound CORESET determine a set of time-frequency resources, and the UE blindly detects the PDCCH in the time-frequency resources.

In some embodiments, PDCCH corresponding to a certain type of CSS is generally called a Group Common PDCCH (GC-PDCCH), as this type of PDCCH is generally monitored by a group of UEs. The PDCCH of the CSS may indicate whether the UE goes to sleep, and explicitly indicate different modes.

In some embodiments, receiving sleep indication information e base station includes receiving downlink control information from base station, wherein two bits in the downlink control information are used to indicate the sleep indication information, and the sleep indication information is transmitted in a PDCCH in a UE-specific search space.

In some embodiments, two bits in the downlink control information are used to indicate whether the UE enters the sleep state and explicitly indicate different modes.

In some embodiments, receiving sleep indication information from the base station includes receiving downlink control information from the base station, wherein one bit and a DCI format in the downlink control information are used to indicate the sleep indication information, and the sleep indication formation transmitted in a PDCCH in a UE-specific search space.

In some embodiments, receiving sleep indication information from the base station includes receiving downlink control information from the base station, wherein one bit and a frequency domain resource allocation field in the downlink control information are used to indicate the sleep indication information, and the sleep indication information is transmitted in a PDCCH in a UE-specific search space.

In some embodiments, receiving sleep indication information from the base station includes receiving downlink control information from the base station, wherein at least one bit in the downlink control information is used to indicate the sleep indication information corresponding to current UE, a subgroup where the current UE is located, or a group where the current UE is located, and the sleep indication information is transmitted in a PDCCH in a common search space.

In some embodiments, for each UE, at least one bit in the downlink control information may be used to indicate the sleep indication information corresponding to the UE. In this case, the UE needs to obtain the sleep indication information based on at least one bit in the corresponding downlink control information.

In some embodiments, considering a limited size of the downlink control information, for each UE subgroup or group, at least one bit in the downlink control information may be used to indicate the sleep indication information corresponding to each UE subgroup or group. In this case, the needs to obtain the sleep indication information based on at least one bit in the downlink control information corresponding to the UE subgroup or group where the UE is located. Generally, a UE group includes a plurality of users monitoring a PDCCH in a current common search space, and a UE subgroup is a subset of the UE group, which is a further division of the UE group.

In some embodiments, the UE obtains a position of at least one bit corresponding to the subgroup or group where the UE is located in the downlink control information through preset configuration or signaling.

In S102, the sleep state is entered, and a different mode is selected based on the sleep indication information.

In some embodiments, the sleep state includes any one of following behaviors: not monitoring PDCCH within on duration, not monitoring one or snore PDCCH search spaces or PDCCH search space sets that need to be monitored in a non-sleep state, or changing from monitoring one or more PDCCH search spaces or PDCCH search space sets that need to be monitored in a non-sleep state to monitoring another one or more PDCCH search spaces or PDCCH search spaces sets. It is well known in the art that the sleep state is also called dormancy.

In some embodiments, the mode refers to a type behavior, a sub-state, a state type, or a behavior mode of the UE, and may also be referred to as a behavior mode. It should be noted that the naming manner does not constitute a limitation on the scope of the present disclosure.

In some embodiments, the UE mays not enter the sleep state based on the sleep indication information.

In some embodiments, the UE may enter the sleep state and select a different mode based on the sleep indication information. For the sleep state, two different a be included. The first type generally occurs when a last scheduling is completed. At this time, the base station considers that the UE has no subsequent services during the on duration and can go to sleep immediately, i.e., a first mode as mentioned below. The second type generally occurs at the beginning of on duration. At this time, the base station considers that the UE has no service during on duration and can stay in the sleep state, that is, a second mode as mentioned below.

In some embodiments, the mode may include the first mode and the second mode corresponding to different scenarios, where the first mode and the second mode define different behaviors.

In some embodiments, the mode includes the first mode and the second mode, wherein the first mode indicates entering the sleep state, and that a current PDCCH has scheduling information, and the second mode indicates entering the sleep state, and that the current PDCCH has no scheduling information.

In some embodiments, for the second mode, as the current PDCCH has no scheduling information, scheduling information bit in DCI is used to indicate at least one of following: a time offset between a moment of entering the sleep state and a moment of waking up, configuration parameters of a PDCCH search space set associated with the sleep state, an index of a PDCCH search space set associated with the sleep state, or an identity (ID) of a PDCCH search space set associated with the sleep state.

In some embodiments, the mode includes the first mode and the second mode, wherein the first mode indicates entering the sleep state without waking up within on duration, and the second mode indicates entering the sleep state which needs to be awakened within On duration.

In some embodiments, for the first mode, as the sleep indication information can be transmitted in a last scheduled PDCCH within the current on duration, the current PDCCH generally has scheduling information.

In some embodiments, for the second mode, as the current PDCCH has no scheduling information, scheduling information bit in downlink control information is used to indicate at least one of following: a time offset between a moment of entering the sleep state and a moment of waking up, configuration parameters of the PDCCH search space set associated with the sleep state, an index of the PDCCH search space set associated with the sleep state, or an identity of the PDCCH search space set associated with the sleep state.

In some embodiments, one bit in the downlink control information may be used to indicate that the UE enters the sleep state, where when the DCI format is a downlink DCI format, it indicates that there is scheduling information in the current PDCCH, and when the DCI format is an uplink DCI format, it indicates that there is no scheduling information in the current PDCCH.

In some embodiments, one bit in the downlink control information may be used to indicate that the UE enters the sleep state, where when the DCI format is a downlink DCI format, it indicates that the UE does not need to wake up after going to sleep within the current On duration, and when the DCI format is an uplink DCI format, it indicates that the UE needs to wake up after going to sleep within the current On duration.

In some embodiments, if one bit and a DCI format in the downlink control information are used to indicate the sleep indication information, entering the sleep state and selecting a different mode based on the sleep indication information includes: when one bit in the downlink control information indicates to enter the sleep state and the DCI format is a downlink DCI format, entering the sleep state and selecting the first mode; or when one bit in the downlink control information indicates to enter the sleep state, and the DCI format is an uplink DCI format, entering the sleep state and selecting the second mode.

In some embodiments, one bit in the downlink control information may be used to indicate the UE to enter the sleep state. When a frequency domain resource allocation field in the DCI is valid resource allocation, it indicates that there is scheduling information in the current PDCCH, and when the frequency domain resource allocation field in the DCI is invalid resource allocation (for example, no frequency domain resource is allocated), it indicates that there is no scheduling information in the current PDCCH.

In some embodiments, one bit in the downlink control information may be used to indicate the UE to enter the sleep state. When the frequency domain resource allocation field in the DCI is valid resource allocation, it indicates that the UE does not need to wake up again after going to sleep within the current On duration, and when the frequency domain resource allocation field in the DCI is invalid resource allocation (for example, no frequency domain resource is allocated), it indicates that the UE needs to wake up again after going to sleep within the current On duration.

In some embodiments, if one bit and a frequency domain resource allocation field in the downlink control information are used to indicate the sleep indication information, entering the sleep state and selecting a different mode based on the sleep indication information includes: when one bit in the downlink control information indicates to enter the sleep state, and the frequency domain resource allocation field is valid frequency domain resource allocation indication, entering the sleep state and selecting the first mode; or when one bit in the downlink control information indicates to enter the sleep state, and the frequency domain resource allocation field is invalid frequency domain resource allocation indication, entering the sleep state and selecting the second mode.

In some embodiments, one bit in the downlink control information may be used to indicate the UE not to enter the sleep state.

In some embodiments, if at least one bit in the downlink control information is used to indicate the sleep indication information corresponding to a current UE, a subgroup where the current UE is located, or a group where the current UE is located, and the sleep indication information is transmitted in a PDCCH in a common search space, the mode includes a first mode and a second mode, wherein the first mode indicates entering the sleep state, and that a PDCCH in a search space set corresponding to a monitoring occasion that is separated by a preset monitoring duration from a current monitoring occasion has scheduling information, and the second mode indicates entering the sleep state, and that the PDCCH in the search space set corresponding to the monitoring occasion that is separated by the preset monitoring duration from the current monitoring occasion has no scheduling information.

In some embodiments, for the first mode, it usually occurs near a last scheduling time in the current on duration. The UE generally needs to enter the sleep state as soon as possible; thus, it may indicate how long the UE will go to sleep, and it may also indicate configuration of a PDCCH search space set associated with the sleep state, an index of a PDCCH search space set associated with the sleep state, or an identity of a PDCCH search space set associated with the sleep state. For the second mode, it usually occurs at the beginning of the On duration, and the UE generally stays in the sleep state, thus, it may indicate how long the UE will wake up again, and it may also indicate configuration of a PDCCH search space set associated with the sleep state, an index of a PDCCH search space set associated with the sleep state, or an identity of a PDCCH search space set associated with the sleep state.

In some embodiments, if at least one bit in the downlink control information is used to indicate the sleep indication information corresponding to a current UE, a subgroup where the current UE is located, or a group where the current UE is located, and the sleep indication information is transmitted in a PDCCH in a common search space, the mode includes a first mode and a second mode, wherein the first mode indicates entering the sleep state without waking up within On duration, and the second mode indicates entering the sleep state which needs to be awakened within On duration.

In some embodiments, for the first mode, it usually occurs near a last scheduling time in the current on duration. The UE generally needs to enter the sleep state as soon as possible; thus, it may indicate how long the UE will go to sleep, and it may also indicate configuration of a PDCCH search space set associated with the sleep state, an index of a PDCCH search space set associated with the sleep state, or an identity of a PDCCH search space set associated with the sleep state. For the second mode, it usually occurs at the beginning of the On duration, and the UE generally stays in the sleep state, thus, it may indicate how long the UE will wake up again, and it may also indicate configuration of a PDCCH search space set associated with the sleep state, an index of a PDCCH search space set associated with the sleep state, or an identity of a PDCCH search space set associated with the sleep state.

In some embodiments, for the first mode, scheduling information bit in the downlink control information is used to indicate at least one of following: a time offset between a moment of entering the sleep state and a moment of waking up, configuration parameters of a PDCCH search space set associated with the sleep state, an index of a PDCCH search space set associated with the sleep state, or an identity of a PDCCH search space set associated with the sleep state.

In some embodiments, for the second mode, scheduling information bit in the downlink control information is used to indicate at least one following: a time offset between a moment of entering the sleep state and a moment of waking up, configuration parameters of a PDCCH search space set associated with the sleep state, an index of a PDCCH search space set associated with the sleep state, or an identity of a PDCCH search space set associated with the sleep state.

In some embodiments, at least one bit in the downlink control information may be used to indicate the UE not to enter the sleep state.

By the above embodiments of the present disclosure, the sleep indication information is received from the base station, and the sleep state is entered, and the different mode is selected based on the sleep indication information. The may be flexibly indicated to enter e sleep state without affecting quality of service, thereby reducing power consumption of the UE and saving power.

Figure 2:
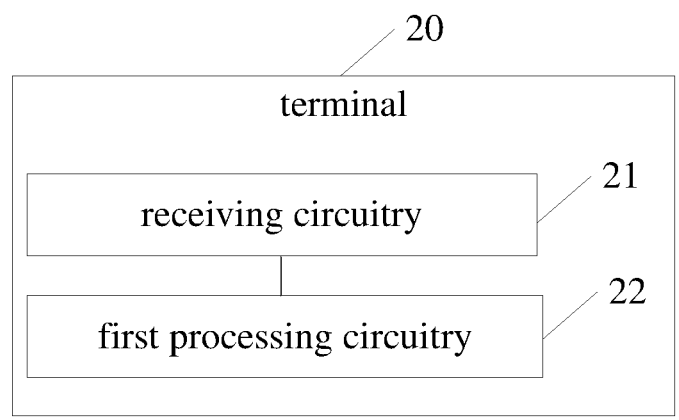
FIG. 2 is a structural diagram of a terminal according to an embodiment.

To enable those skilled in the art to better understand and implement the present disclosure, an embodiment of the present disclosure further provides a terminal (i.e., a UE) capable of performing the above method for determining the sleep state, as shown in FIG. 2.

Referring to FIG. 2, the terminal 20 may include a receiving circuitry 21 and a first processing circuitry 22.

The receiving circuitry 21 is configured to receive sleep indication information from a base station.

The first processing circuitry 22 is configured to enter a sleep state and select a different mode based on the sleep indication information.

In some embodiments, the terminal 20 further includes: a second processing circuitry (not shown) configured to not enter the sleep state based on the sleep indication information.

In some embodiments, the sleep state includes any one of following behaviors: not monitoring PDCCH within on duration, not monitoring one or more PDCCH search spaces or PDCCH search space sets that need to be monitored in a non-sleep state, or changing from monitoring one or more PDCCH search spaces or PDCCH search space sets that need to be monitored in a non-sleep state to monitoring another one or more PDCCH search spaces or PDCCH search space sets.

In some embodiments, the mode includes a first mode and a second mode, wherein the first mode indicates entering the sleep state, and that a current PDCCH has scheduling information, and the second mode indicates entering the sleep state, and that the current PDCCH has no scheduling information.

In some embodiments, for e second mode, scheduling information bit in DCI is used to indicate at least one of following: a time offset between a moment of entering the sleep state and a moment of waking up, configuration parameters of a PDCCH search space set associated with the sleep state, an index of a PDCCH search space set associated with the sleep state, or an identity of a PDCCH search space set associated with the sleep state.

In some embodiments, the mode includes a first mode and a second mode, wherein the first mode indicates entering the sleep state without waking up within On duration, and the second mode indicates entering the sleep state which needs to be awakened within On duration.

In some embodiments, for the second mode, scheduling information bit in downlink control information is used to indicate at least one of following: a time offset between a moment of entering the sleep state and a moment of waking up, configuration parameters of the PDCCH search space set associated with the sleep state, an index of the PDCCH search space set associated with the sleep state, or an identity of the PDCCH search space set associated with the sleep state.

In some embodiments, the receiving circuitry 21 is configured to receive downlink control information from the base station, wherein two bits in the downlink control information are used to indicate the sleep indication information, and the sleep indication information is transmitted in a PDCCH in a UE-specific search space.

In some embodiments, the receiving circuitry 21 is configured to receive downlink control information from the base station, wherein one bit and a DCI format in the downlink control information are used to indicate the sleep indication information, and the sleep indication information is transmitted in a PDCCH in a UE-specific search space.

In some embodiments, the first processing circuitry 22 is configured to: when one bit in the downlink control information indicates to enter the sleep state and the DCI format is a downlink DCI format, enter the sleep state and select the first mode; or when one bit in the downlink control information indicates to enter the sleep state, and the DCI format is an uplink DCI format, enter the sleep state and select the second mode.

In some embodiments, the first processing circuitry is configured to receive downlink control information from the base station, wherein one bit and a frequency domain resource allocation field in the downlink control information are used to indicate the sleep indication information, and the sleep indication information is transmitted in a PDCCH in a UE-specific search space.

In some embodiments, the first processing circuity 22 is configured to: when one bit in the downlink control information indicates to enter the sleep state, and the frequency domain resource allocation field is valid frequency domain resource allocation indication, enter the sleep state and select the first mode; or when one bit in the downlink control information indicates to enter the sleep state, and the frequency domain resource allocation field is invalid frequency domain resource allocation indication, enter the sleep state and select the second mode.

In some embodiments, the first processing circuitry 22 is configured to receive downlink control information from the base station, wherein at least one bit in the downlink control information is used to indicate the sleep indication information corresponding to the terminal 20, a subgroup where the terminal 20 is located, or a group where the terminal 20 is located, and the sleep indication information is transmitted in a PDCCH in a common search space.

In some embodiments, the mode includes a first mode and a second mode, wherein the first mode indicates entering the sleep state, and that a PDCCH in a search space set corresponding to a monitoring occasion that is separated by a preset monitoring duration from a current monitoring occasion has scheduling information, and the second mode indicates entering the sleep state, and that the PDCCH in the search space set corresponding to the monitoring occasion that is separated by the preset monitoring duration from the current monitoring occasion has no scheduling information.

In some embodiments, the mode includes a first mode and a second mode, wherein the first mode indicates entering the sleep state without waking up within On duration, and the second mode indicates entering the sleep state which needs to be awakened within On duration.

In some embodiments, for the first mode, scheduling information bit in the downlink control information is used to indicate at least one of following: a time offset between a moment of entering the sleep state and a moment of waking up, configuration parameters of a PDCCH search space set associated with the sleep state, an index of a PDCCH search space set associated with the sleep state, or an identity of a PDCCH search space set associated with the sleep state.

In some embodiments, for the second mode, scheduling information bit in the downlink control information is used to indicate at least one of following: a time offset between a moment of entering the sleep state and a moment of waking up, configuration parameters of a PDCCH search space set associated with the sleep state, an index of a PDCCH search space set associated with the sleep state, or an identity of a PDCCH search space set associated with the sleep state.

More details of working procedures and principles of the terminal 20 can be found in descriptions of the method provided in the above embodiments and are not described in detail here.

In an embodiment of the present disclosure, a nonvolatile or non-transitory computer readable storage medium having computer instructions stored therein is provided, wherein when the computer instructions are executed, any one above methods is performed.

In an embodiment of the present disclosure, a terminal including a memory and a processor is provided, wherein the memory has computer instructions stored therein, and when the processor executes the computer instructions, any one of the above methods is performed.

Those skilled in the art could understand that all or parts of the steps in the various methods of the above-mentioned embodiments may be completed by a program instructing relevant hardware, and the program may be stored in any computer-readable storage medium. The storage medium may include a Read Only Memory (ROM), a Random Access Memory (RAM), a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit scope of the present disclosure.

What is claimed is:

1. A method for determining a sleep state, comprising:
receiving sleep indication information from a base station; and
entering the sleep state based on the sleep indication information;
wherein said receiving the sleep indication information from the base station comprises:
receiving downlink control information from the base station, wherein at least one bit in the downlink control information is used to indicate the sleep indication information corresponding to a current User Equipment (UE), a subgroup where the current UE is located, or a group where the current UE is located, and the sleep indication information is transmitted in a Physical Downlink Control Channel (PDCCH) in a common search space.

2. The method according to claim 1, further comprising: based on the sleep indication information, not entering the sleep state.

3. The method according to claim 2, wherein the sleep state comprises any one of following behaviors:
not monitoring PDCCH within on duration, not monitoring one or more PDCCH search spaces or PDCCH search space sets that need to be monitored in a non-sleep state, or changing from monitoring one or more PDCCH search spaces or PDCCH search space sets that need to be monitored in a non-sleep state to monitoring another one or more PDCCH search spaces or PDCCH search space sets.

4. The method according to claim 2, further comprising selecting a different mode based on the sleep indication information;
wherein the mode comprises a first mode and a second mode,
wherein the first mode indicates entering the sleep state, and that a current PDCCH has scheduling information, and the second mode indicates entering the sleep state, and that the current PDCCH has no scheduling information.

5. The method according to claim 4, wherein for the second mode, scheduling information bit in Downlink Control Information (DCI) is used to indicate at least one of following:
a time offset between a moment of entering the sleep state and a moment of waking up, configuration parameters of a PDCCH search space set associated with the sleep state, an index of a PDCCH search space set associated with the sleep state, or an identity of a PDCCH search space set associated with the sleep state.

6. The method according to claim 2, further comprising 2, selecting a different mode based on the sleep indication information;
wherein the mode comprises a first mode and a second mode,
wherein the first mode indicates entering the sleep state without waking up within on duration, and the second mode indicates entering the sleep state which needs to be awakened within On duration.

7. The method according to claim 6, wherein for the second mode, scheduling information bit in downlink control information is used to indicate at least one of following:
a time offset between a moment of entering the sleep state and a moment of waking up, configuration parameters of the PDCCH search space set associated with the sleep state, an index of the PDCCH search space set associated with the sleep state, or an identity of the PDCCH search space set associated with the sleep state.

8. The method according to claim 4, wherein said receiving sleep indication information from a base station comprises:
receiving downlink control information from the base station, wherein two bits in the downlink control information are used to indicate the sleep indication information, and the sleep indication information is transmitted in a PDCCH in a UE-specific search space.

9. The method according to claim 4, wherein said receiving sleep indication information from a base station comprises:
receiving downlink control information from the base station, wherein one bit and a DCI format in the downlink control information are used to indicate the sleep indication information, and the sleep indication information is transmitted in a PDCCH in a LIE-specific search space.

10. The method according to claim 9, wherein said entering the sleep state and selecting a different mode based on the sleep indication information comprises:
when one bit in the downlink control information indicates to enter the sleep state and the DCI format is a downlink DCI format, entering the sleep state and selecting the first mode; or
when one hit in the downlink control information indicates to enter the sleep state, and the DCI format is an uplink DCI format, entering the sleep state and selecting the second mode.

11. The method according to claim 4, wherein said receiving sleep indication information from a base station comprises:
receiving downlink control information from the base station, wherein one bit and a frequency domain resource allocation field in the downlink control information are used to indicate the sleep indication information, and the sleep indication information is transmitted in a PDCCH in a UE-specific search space.

12. The method according to claim 11, wherein said entering the sleep state and selecting a different mode based on the sleep indication information comprises:
when one bit in the downlink control information indicates to enter the sleep state, and the frequency domain resource allocation field is valid frequency domain resource allocation indication, entering the sleep state and selecting the first mode; or
when one bit in the downlink control information indicates to enter the sleep state, and the frequency domain resource allocation field is invalid frequency domain resource allocation indication, entering the sleep state and selecting the second mode.

13. The method according to claim 1, further comprising selecting a different mode based on the sleep indication information;
wherein the mode comprises a first mode and a second mode,
wherein the first mode indicates entering the sleep state, and that a PDCCH in a search space set corresponding to a monitoring occasion that is separated by a preset monitoring duration from a current monitoring occasion has scheduling information, and the second mode indicates entering the sleep state, and that the PDCCH in the search space set corresponding to the monitoring occasion that is separated by the preset monitoring duration from the current monitoring occasion has no scheduling information.

14. The method according to claim 1, further comprising selecting a different mode based on the sleep indication information;
wherein the mode comprises a first mode and a second mode,
wherein the first mode indicates entering the sleep state without waking up within on duration, and the second mode indicates entering the sleep state which needs to be awakened within On duration.

15. The method according to claim 13, wherein for the first mode, scheduling information bit in the downlink control information is used to indicate at least one of following:
- a time offset between a moment of entering the sleep state and a moment of waking up, configuration parameters of a PDCCH search space set associated with the eel state, an index of a PDCCH search space set associated with the sleep state, or an identity of a PDCCH search space set associated with the sleep state.

16. The method according to claim 13, wherein for the second mode, scheduling information bit in the downlink control information is used to indicate at least one of following:
- a time offset between a moment of entering the sleep state and a moment of waking up, configuration parameters of a PDCCH search space set associated with the sleep state, an index of a PDCCH search space set associated with the sleep state, or an identity of a PDCCH search space set associated with the sleep state.

17. A non-volatile or non-transitory computer readable storage medium storing one or more programs, the one or more programs comprising computer instructions, which, when executed by a processor, cause the processor to:
- receive sleep indication information from a base station; and
- enter the sleep state based on the sleep indication information;
- wherein said receiving the sleep indication information from the base station comprises:
- receiving downlink control information from the base station, wherein at least one bit in the downlink control information is used to indicate the sleep indication information corresponding to a current User Equipment (UE), a subgroup where the current UE is located, or a group where the current UE is located, and the sleep indication information is transmitted in a Physical Downlink Control Channel (PDCCH) in a common search space.

18. A terminal comprising a memory and a processor, wherein the memory stores one or more programs, the one or more programs comprising computer instructions, which, when executed by the processor, cause the processor to:
- receive sleep indication information from a base station; and
- enter the sleep state based on the sleep indication information;
- wherein said receiving the sleep indication information from the base station comprises:
- receiving downlink control information from the base station, wherein at least one bit in the downlink control information is used to indicate the sleep indication information corresponding to a current User Equipment (UE), a subgroup where the current UE is located, or a group where the current UE is located, and the sleep indication information is transmitted in a Physical Downlink Control Channel (PDCCH) in a common search space.

19. The terminal according to claim 18, wherein the processor is further caused:
- based on the sleep indication information, not enter the sleep state.

20. The terminal according to claim 19, wherein the processor is further caused to select a different mode based on the sleep indication information;
- wherein the mode comprises a first mode and a second node,
- wherein the first mode indicates entering the sleep state, and that a current PDCCH has scheduling information, and the second mode indicates entering the sleep state, and that the current PDCCH has no scheduling information.

* * * * *